United States Patent [19]

Miller

[11] Patent Number: 6,028,837

[45] Date of Patent: *Feb. 22, 2000

[54] ETHER RING ARCHITECTURE FOR LOCAL AREA NETWORKS

[75] Inventor: David J. Miller, Lawrenceville, Ga.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,454

[22] Filed: Aug. 27, 1996

[51] Int. Cl.$^7$ .................................................. H04L 12/433
[52] U.S. Cl. ........................ 370/222; 370/452; 370/909; 375/212; 340/825.06
[58] Field of Search ..................................... 370/293, 257, 370/258, 221, 222, 246, 241–243, 248, 462, 463, 501, 502, 507, 508, 516–519, 522, 528, 509, 908–910, 492; 340/825.05, 825.06; 375/211, 212, 213, 214

[56] References Cited

U.S. PATENT DOCUMENTS

| | | | |
|---|---|---|---|
| 4,514,841 | 4/1985 | Sem-Sandberg | 370/463 |
| 4,701,910 | 10/1987 | Ulug | 370/228 |
| 4,759,009 | 7/1988 | Casady et al. | 370/221 |
| 4,760,571 | 7/1988 | Schwarz | 370/445 |
| 4,845,709 | 7/1989 | Matsumoto et al. | 370/452 |
| 5,155,726 | 10/1992 | Spinney et al. | 370/296 |
| 5,168,272 | 12/1992 | Akashi et al. | 340/825.05 |
| 5,181,202 | 1/1993 | Walser et al. | 370/452 |
| 5,243,335 | 9/1993 | Kato et al. | 340/825.05 |
| 5,247,518 | 9/1993 | Takiyasu et al. | 370/466 |
| 5,257,259 | 10/1993 | Tsurumi | 370/354 |
| 5,274,637 | 12/1993 | Sakamura et al. | 370/455 |
| 5,305,306 | 4/1994 | Spinney et al. | 370/296 |
| 5,317,198 | 5/1994 | Husbands | 370/222 |
| 5,377,228 | 12/1994 | Ohara et al. | 375/211 |
| 5,530,694 | 6/1996 | Guezou et al. | 370/223 |
| 5,555,540 | 9/1996 | Radke | 370/462 |
| 5,652,758 | 7/1997 | Donley | 370/503 |
| 5,737,370 | 4/1998 | Hetzel | 370/222 |
| 5,751,699 | 5/1998 | Radke | 370/258 |

OTHER PUBLICATIONS

Stallings, W., Local Network Technology, Chapter 3, pp. 63–88; Local Area Networks: Topologies and Transmission Media, Chapter 4, pp. 89–120, *Local Networks,* Third Edition, 1990.

WernerBux, Token–Ring Local–Area Networks and Their Performance, Proceedings of IEEE vol. 77, No. 2, pp. 238–241, Feb. 1989.

*Primary Examiner*—Douglas W. Olms
*Assistant Examiner*—Seema S. Rao
*Attorney, Agent, or Firm*—Limbach & Limbach LLP

[57] ABSTRACT

A ring topology based architecture for a local area network. The transmission medium is unshielded twisted-pair wire. A set of two such twisted-pairs are used to connect the nodes of the network together, with the transmit twisted-pair wires from one node being connected to the receive twisted-pair wires of the next node. When a node of the network is powered up, a relay is opened which disconnects the incoming receive lines from the outgoing transmit lines. This brings the node on line. The relay is controlled via software command and a timer which is used to take a preceding node off-line for a predetermined period in the event jabber from that node is detected. A 16 byte FIFO bypass built into the medium access control hardware of the system is used to reduce the ring latency which normally results from the need to store entire data packets at each node, prior to the packet being forwarded. The FIFO bypass is used to detect the source and destination addresses for the data packets, and to determine if a packet should be forwarded along the ring. If a node is transmitting a packet when it receives a new packet, the incoming data is buffered until the current transmission is completed. This avoids the collision problem common in bus topologies.

9 Claims, 2 Drawing Sheets

ETHER RING ARCHITECTURE FOR LOCAL AREA NETWORKS

TECHNICAL FIELD

The present invention relates to architectures for local area networks, and more specifically, to a ring topology networking architecture using unshielded, twisted-pair full-duplex technology which provides improved performance and lower cost compared to existing ring and bus-based topology networks.

BACKGROUND OF THE INVENTION

Local area networks (LANS) are data transmission systems consisting of a set of nodes which are interconnected by links. The nodes may be terminals, computers, printers, storage devices, etc. The links may be coaxial cable, twisted-pair wires, or fiber-optic cable. LANs are used for such purposes as transmission of messages among the nodes, resource sharing, and transfer of data or files from one storage medium to another.

Three characteristics that are used to differentiate LAN architectures are network topology, the transmission medium, and the method of controlling access to the medium. Each combination of these characteristics has inherent advantages and disadvantages which determine its suitability for a particular application.

The network topology refers to the manner in which the endpoints or nodes of the network are interconnected. The specific topology used in a LAN is important as it determines the data paths that may be used between any pair of nodes. The four primary network topologies used in LAN systems are the bus, tree, ring, and star topologies.

In a ring topology, the network consists of a set of repeaters joined by point-to-point links in a closed loop. Each repeater receives data from one link and transmits the data, bit by bit, on the second link to which it is attached. The data is transmitted as fast as it is received with no buffering at the repeater. The links are unidirectional so that data is only transmitted in one direction. Each node or station of the network attaches to the LAN at a repeater. Data is transmitted in packets, with each packet containing control information used by each repeater in the ring to determine whether to pass the data to the station attached to that repeater (the destination station for the data) or to the next repeater in the ring.

In a bus topology based LAN, the network is the transmission medium. All of the nodes are directly attached by means of the appropriate hardware to a linear transmission medium or bus. Data transmitted from any one node propagates the length of the medium and can be received by any other node connected to the medium.

The transmission medium is the path between the nodes (or repeaters) of a LAN. Typical mediums used in LANs are twisted-pair, coaxial cable, and optical fibers. Twisted-pair is the medium used to connect the telephones in a building together, or to connect the phones in a local geographic area to a central exchange. It consists of two insulated wires arranged in a spiral pattern. A wire pair serves as a communication link between nodes or stations.

One well-known LAN architecture is that named "Ethernet", which is based on a bus topology. In a twisted-pair medium implementation of Ethernet, the nodes or stations are attached to a central hub. The hub functions both to connect all of the nodes to a common bus and also acts as a repeater for the data packets. In the Ethernet architecture, the nodes are connected to the central hub by means of two twisted-pair transmission mediums, one for transmission to the hub, the other for receiving data from the hub. When a node transmits a data packet, it is received by the hub and then re-transmitted to each of the nodes connected to the hub. An Ethernet LAN typically operates at a data rate of 10 mBit/sec (10 million bits/sec).

Although the Ethernet architecture is suitable for use in many environments, it does have some disadvantages. Ethernet systems which utilize twisted-pair wires as the transmission medium require a central hub or repeater, which in the case of a 100 mBit/sec (100 million bits/sec) data transfer rate system can be quite expensive. This cost limits the use of such high data rate systems for home or small business use.

A second disadvantage is that because all nodes in an Ethernet system monitor the same bus, only one node can transmit a data packet at a time. If multiple nodes attempt to transmit at approximately the same time, collisions between data packets may occur. These collisions are detected by the nodes, resulting in the production of a jam signal which causes the nodes to cease transmitting. The nodes then reschedule their respective transmissions based on a probabilistic analysis which includes consideration of how many times each nodes' packet has collided. This method of controlling access to the medium is termed carrier sense, multiple access with collision detection, or CSMA/CD. The possibility of collisions, and the CSMA/CD control protocol used in response complicate the system requirements by requiring an additional layer of overhead. This degrades the system's performance by reducing system throughput.

Yet another disadvantage of Ethernet-type bus-based LAN architectures is that the maximum latency of transmissions between nodes is not predictable. This is because a data packet transmitted by one node or station is received by each of the other stations. As a result, it is not possible to predict the maximum time delays between transmissions from one station to another. This complicates attempts to use such an architecture for real-time interactive communications such as audio and video conferencing.

Although ring-based networks do not suffer from the collision problem noted with regards to bus networks, they also have some inherent disadvantages. In a ring-based LAN architecture, as data packets circulate around the ring, the receiver in each station recovers the binary data from the received signal. To perform this function accurately, the receiver needs to know the starting and ending times of each data bit. This allows a proper sampling of the received signal. However, accurate knowledge of this timing information requires synchronization of the stations on the ring. This is typically accomplished by encoding the clock data used to synchronize the stations into the data streams. However, in a ring-based LAN, the recovered clock signal may deviate from its intended value due to several reasons: (1) noise during transmission of the data; (2) receiver circuitry induced deviations; and (3) propagation delay distortion of the signal. This clock deviation is termed "timing jitter". In a ring architecture, this jitter accumulates as a data packet circulates from station to station, causing the data to become less reliable.

Another disadvantage of ring topology networks is the use of "tokens" for controlling access to the transmission medium and for determining packet transferral around the ring. A token is a control frame that circulates around each node of the ring when all of the stations are idle. A station having a data packet to transmit must wait until a token is detected passing by the station. The station retrieves and alters the token, and then appends the message data packet to the altered token. This removes the token from the ring so that any other station wishing to transmit a data packet must wait until the altered token plus message data has completed one round trip around the ring. At this point the station which transmitted the packet removes it and inserts a new token into the ring. Since the tokens and messages must traverse the entire ring prior to another station being allowed to transmit, this control method reduces the throughput of the network. Note that tokens may also be used for controlling access to the transmission medium in bus-based networks.

What is desired is a local area network architecture which can achieve the benefits of a high data transfer rate Ethernet or bus topology based system, but without the inherent disadvantages.

SUMMARY OF THE INVENTION

The present invention is directed to a ring topology based architecture for a local area network. The transmission medium is unshielded twisted-pair wire. A set of two such twisted-pairs are used to connect the nodes of the network together, with the transmit twisted-pair wires from one node being connected to the receive twisted-pair wires of the next node. This eliminates the need for a central hub and produces a system which offers the flexibility of working in either a hubless or a traditional hub architecture. This provides a flexibility to the nodes not found in standard LANs.

Each node in the network scans the source/destination addresses of data packets as they circulate on the network. Unmatched and broadcast packets intended for all nodes are forwarded to the next node in the ring. Matched destination packets are taken off of the ring at the destination node. Matched source address packets are removed from the network by the source node as either being unreceived or broadcast.

When a node of the network is powered up, a relay is opened which disconnects the incoming receive lines from the outgoing transmit lines. This brings the node on line. The relay is controlled via software command and a timer, with the timer being used to take a node off-line for a predetermined period in the event jabber from that node is detected by a following node. In order to overcome the timing jitter problem inherent in most ring topology networks, a clock signal is regenerated at each node of the network of the present invention.

A 16 byte FIFO bypass built into the medium access control hardware of the system is used to reduce the ring latency which normally results from the need to store entire data packets at each node, prior to the packet being forwarded. The FIFO bypass is used to detect the source and destination addresses for the data packets, and to determine if a packet should be forwarded along the ring. Logic for the control of the FIFO bypass and to determine if a packet should be accepted and/or forwarded is also included in the medium access control layer of the invention. If a node is transmitting a packet when it receives a new packet, the incoming data is buffered until the current transmission is completed. This avoids the collision problem common in bus topologies.

Further objects and advantages of the present invention will become apparent from the following detailed description and accompanying drawings.

DETAILED DESCRIPTION OF THE INVENTION

The present invention is a local area network architecture having features similar to Ethernet unshielded twisted-pair, full duplex technology, but which is implemented in a ring topology. Owing to its combination of certain features common to both Ethernet bus topology and ring topology networks, the present invention has been termed an "ETHER RING" architecture by the inventor. This ETHER RING architecture has advantages compared to both bus and ring topology based networks, while overcoming many of the disadvantages of each. The node circuitry of the present invention may be used in either a ring or a bus based LAN, thereby providing added flexibility to the nodes.

In accordance with the present invention, the medium access control (MAC) circuitry used in typical Ethernet bus based architectures is modified to include a relay which is used to connect a node to the preceding and following nodes. The relay is used to keep the ring intact if a node is off-line. A timer is used to take a node off-line when jabbering is detected. A FIFO bypass buffer and associated logic included in the MAC circuitry reduces the latency problem which would occur if entire packets of data were stored and forwarded at each node by determining when a data packet should be forwarded to the next node in the ring. The timing jitter problem inherent in typical ring topology based networks is overcome by the use of localized synchronization clocks whose signals are regenerated at each node independently of the previous node.

The architecture of the present invention can be used to create a hub-less network suited for use with 100 mBit/sec (or higher) data transfer rates. This would make such data rates accessible to home applications and small businesses which might be disinclined to implement such systems owing to the cost per node of a 100 mBit repeater. A second benefit to the present invention is the potential performance improvement over a bus based architecture which uses a CSMA/CD protocol for medium access control. In the situation in which all nodes of the network are transmitting simultaneously, the performance will degrade to nearly that of a CSMA based system. However, even in this case, the elimination of both packet collisions (by virtue of the ring architecture) and the inherent inefficiency of bus based systems increases the overall network performance.

Figure 1:
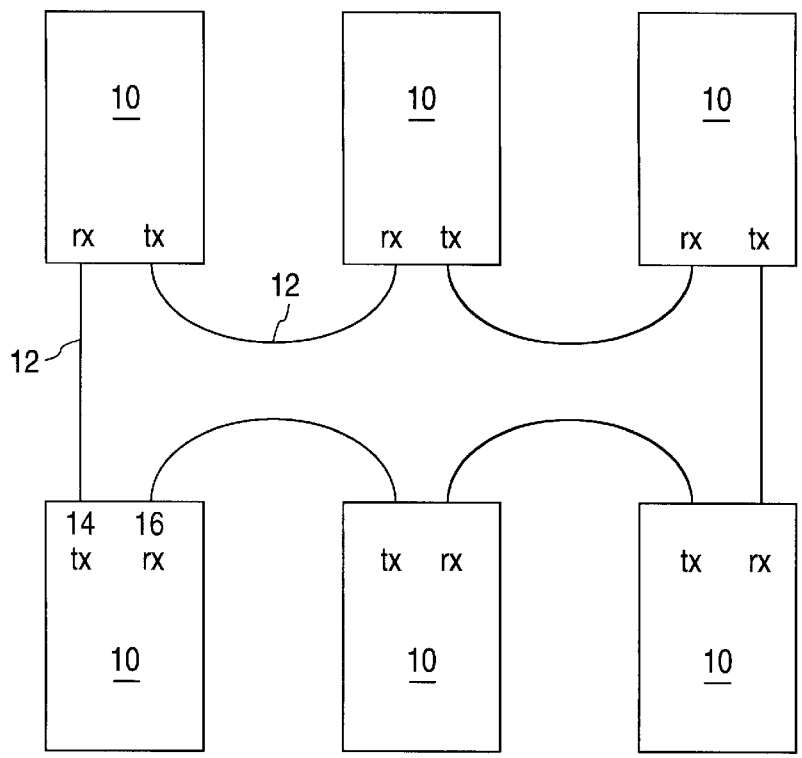
FIG. 1 is a diagram showing the connections between nodes in the ETHER RING local area network architecture of the present invention.

FIG. 1 is a diagram showing the connections between nodes 10 in the ETHER RING local area network architecture of the present invention. As shown in the figure, nodes 10 are connected by transmission medium 12, where medium 12 connects transmit lines 14 of a node to receive lines 16 of the following node. In the present invention, medium 12 is unshielded, twisted-pair wiring such as that used to connect telephone stations in a home or building. The architecture shown in FIG. 1 is characterized as a ring topology because each node is only connected to a preceding node and a subsequent node.

Figure 2:
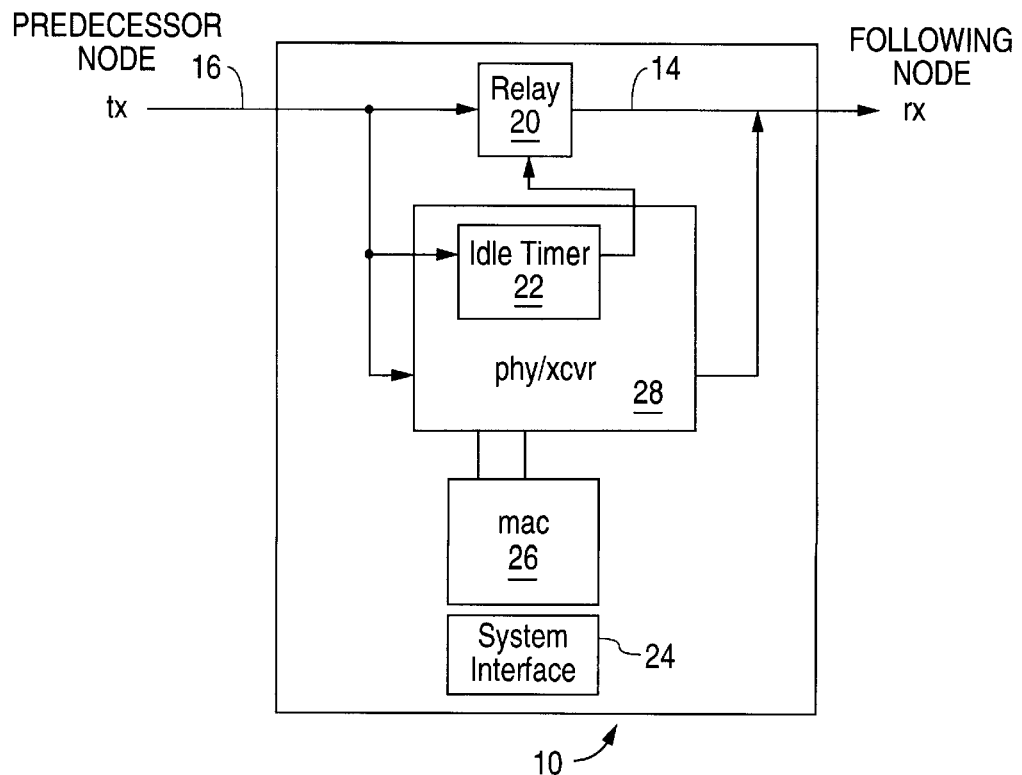
FIG. 2 is a block diagram of the circuitry contained in each node of the ETHER RING architecture of the present invention.

FIG. 2 is a block diagram of the circuitry contained in each node 10 of the ETHER RING architecture of the present invention. As shown in the figure, transmit lines from the preceding node labeled "tx" in the figure) are input to receive lines 16 of node 10 and connected to a relay 20 contained in the node circuitry. Transmit lines 14 of node 10 are connected to the receive lines (labeled "rx" in the figure) of the subsequent node. Each node is capable of full-duplex operation, so that it is able to transmit and receive data at the same time.

Relay 20 is controlled by idle timer control module 22 which is controlled by signals from system interface 24 which are transferred by medium access control module 26. System interface 24 connects the circuitry contained in node 10 to an external controller or processor. Idle timer control module 22 contains a timer which is used to implement the "jabber" control method of the present invention. Medium access control (MAC) module 26 functions to allow access to the transmission medium (lines 14 and 16) by controlling the operation of transceiver 28. When node 10 is unpowered, relay 20 is closed, causing the receive lines input to node 10 (the transmit lines from the previous node) to be connected to the transmit lines for node 10, thereby by-passing node 10 by connecting the transmit lines for the previous node to the receive lines for the subsequent node.

Upon powering up of node 10 and initialization of MAC module 26, relay 20 is opened and the node is brought on-line. This is accomplished by connecting transmit line 14 and receive line 16 to transceiver 28. Ethernet systems typically use a "GOODLINK" signal (in the 10 mbit capacity systems) or an "IDLE" signal (in 100 mbit systems) which is transmitted between nodes to indicate to a node that its preceding node is capable of transmission and is properly operating for use in the network. The GOODLINK or IDLE signal is generated by transceiver 28 and transmitted between data packets circulating through the ring. The GOODLINK or IDLE signal is received on receive lines 16 from the preceding node and input to idle timer control 22 and transceiver 28. When the GOODLINK or IDLE signal is present, each node is capable of normally receiving and transmitting. When the GOODLINK or IDLE signal is not present on the receive lines of a node, idle timer control module 22 causes relay 20 to close, taking the node off-line for a predetermined time period corresponding to the "timeout" period of the idle timer.

The timing jitter problem inherent in typical ring topology based networks is overcome by the use of localized synchronization clocks contained in MAC module 26, with the clock signals being regenerated at each node independently of the previous node. The regenerated clock signals are encoded within the data packets being passed along by each node in the ring, providing an efficient means of synchronizing the transfer of data between the stations.

A common problem to a LAN is the situation wherein a node generates noise, termed "jabber". In an Ethernet bus system this problem is addressed by a protocol which causes all of the connected stations to cease transmissions and verify that they are operating properly. While this method works, it reduces the efficiency of the network because the operation of each station is affected. In another form of an Ethernet LAN, if the central hub (repeater) detects a jabbering node, it issues control signals which cause the node to be taken off-line.

In the present invention, when a node begins to jabber, the node following the jabbering node in the ring senses the noise being transmitted and sends a message along the ring to the predecessor of the jabbering node. Since each node is aware of the addresses of their upstream and downstream neighboring nodes, the jabber control message can be properly targeted. The predecessor node of the jabbering node then causes the GOODLINK or IDLE signal to that node to be disabled. This signals the jabbering node's idle timer control module that the link has been broken and causes that node's relay to close. This takes the jabbering node off-line, in effect allowing data packets to by-pass the offending node. A GOODLINK or IDLE timer then initiates a timing sequence. After the predetermined timeout period, the predecessor node of the jabbering node restores the GOODLINK or IDLE signal, which propagates to the node following the jabbering node via the relay in the jabbering node. During the timeout period the jabbering node resets and performs diagnostic functions. After completion of the diagnostic functions, the jabbering node must resynchronize to the network before returning to on-line status by opening relay 20 contained in that node.

A form of a device which can serve as a GOODLINK or IDLE timer is typically present in the circuitry which forms the physical layer interface for the system. It is therefore within the abilities of one of skill in the art to provide an output signal of idle timer 22 which indicates a "timing out" of the counter or timer and forms the basis for the relay control logic.

The control logic for the relay contained in each node is shown in the following truth table:

| Relay Control Logic Truth Table | | | |
|---|---|---|---|
| enable/input | GOODLINK/ IDLE input | reset/input | relay enable/output |
| X | disabled | 0 | 0 |
| X | X | 1 | 0 |
| positive edge (second) | X | negative edge (first) | 1 |
| 1 | 1 | 0 | 1 |

The first entry (first row) of the truth table shows the case where the GOODLINK signal for a node is discontinued for a pre-set time period while the node is in normal operation. This corresponds to the situation where the following node is jabbering. As described, the relay for the following node would be disabled.

The second row shows the case where the CPU (or system controller) is reset, with the node relay off-line. The third row represents a sequence of events. The reset signal becomes de-asserted, followed by an enable signal asserted from the processor. This set of signals occurs during initialization, and is used when the network itself is being brought on-line. The fourth row shows the case where the node is enabled and in normal operation, with a GOODLINK signal being received from the preceding node and the receiving node is enabled.

As noted, a potential disadvantage of ring topology systems is that data packets are stored in their entirety prior to being passed to a controller. A standard Ethernet node typically has a 2K byte deep FIFO (first-in-first-out) buffer built in, to allow an entire data packet to be stored at the node before it's transferred to the controller (computer system). There are two primary advantages to this: 1) the card can determine that the data in the packet is good before sending it to the computer and taking up computer resources; and 2) if the computer is busy and does not respond quickly enough in removing the data from the node station, if there is not enough buffering capacity, data would be lost.

While this type of data buffer is efficient in a bus topology system, it introduces substantial latency into a ring-based system. This is because every node would receive each entire data packet, transfer the packet to the computer, and have the computer re-transmit it through the node to the next station. This significantly increases the transit time for a data packet around the ring.

In accordance with the present invention, a 16 byte FIFO bypass buffer is added to the MAC layer circuitry of each node. The bypass buffer size is chosen to provide enough storage for the source and destination node addresses of the data packet. The FIFO bypass mode allows a node to work either in a bus or a ring topology. If the node is in a ring, and it receives a packet, it stores just enough information to determine whether the data needs to be sent to the next node or station.

If the data does need to be forwarded, the FIFO bypass allows the packet to be sent directly on with minimal delay, rather than being stored and forwarded in its entirety. This buffering function is used for interfacing with the computer, in both ring and bus topologies. However, for re-transmitting data as is required in a ring topology, a full FIFO is unnecessary. The FIFO bypass of the present invention allows the data to be routed along the path it needs, to the next node of the ring or to the system (or both in the case of broadcast packets).

Figure 3:
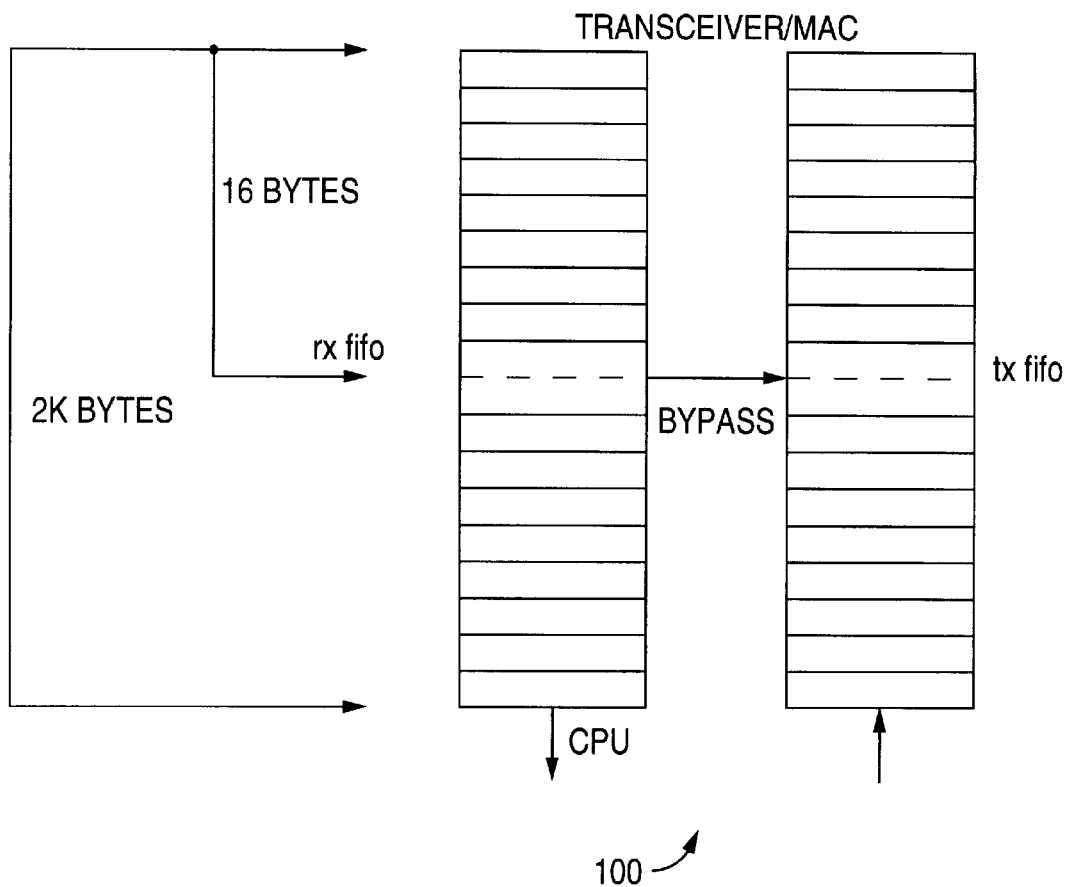
FIG. 3 is a diagram showing the FIFO bypass buffer used to temporarily store address information for a packet of data which is being sent between the medium access control layer and the system interface of a node of the ETHER RING architecture of the present invention.

FIG. 3 is a diagram showing FIFO bypass buffer 100 which is used to temporarily store address information for a packet of data which is being sent between the medium access control layer and the system interface (CPU) of a node in the ETHER RING architecture of the present invention. As described, bypass buffer 100 is typically 16 bytes in size, although it may be larger, e.g. large enough to store the entire packet of data.

In an Ethernet environment, the MAC circuitry in a node would examine the destination address of a received data packet and compare it with a lookup table to determine if the packet is intended for that node. If the address indicates the packet is not intended for that node, it would be discarded (not forwarded to the CPU), assuming another node would receive and keep the packet.

However, in the ETHER RING architecture of the present invention, if the MAC circuitry for a first node determines that the data packet is intended for another node, the packet is redirected to the transmit FIFO buffer of the first node. This leads to the packet being sent to the next node in the ring. This speeds up the re-transmission of a data packet when compared to the normal operation of ring-type networks.

The MAC circuitry of a node also monitors the source address of a data packet. In the event that the source address matched the node address, the MAC circuitry would notify the CPU that the data packet was not received and would not forward the packet.

As previously mentioned, the handling of "collisions" between data packets is an issue that must be addressed in a LAN network. This problem is handled in the present ETHER RING architecture by having each node capable of storing a received data packet in situations in which a packet is received while the node is transmitting. When the transmission of the node's own packet is completed, the node forwards the received packet to the next node. This requires that a node be capable of full-duplex operation, i.e., the ability to transmit and receive data packets simultaneously.

This capability permits establishment of a ring wide protocol for determining packet transmission priority. In a system of n nodes, a node would only place a new packet on the ring once every n packets if it was constantly receiving data. However, priorities could be established for nodes to pass more essential network traffic before adding new packets to the network.

In order to demonstrate the performance of the ETHER RING architecture of the present invention, it is useful to consider the case of a 10 node network. In a network using the standard CSMA access control protocol, if all nodes are transmitting simultaneously, packet collision and node back-off occurs. This is followed by a node re-transmitting and then the remaining 9 nodes trying to transmit at the same time. After a time corresponding to the transmission of 10 data packets and 9 collision times later, all of the data packets have been successfully sent along the network. The throughput for each node in a 100 mBit capacity network is 10 mBit/sec. The maximum total network throughput is 100 mBit/sec.

In the ETHER RING network, the worst case for a performance analysis would be when all 10 nodes want to send data packets to their respective predecessors on the network. Each node would transmit their packets simultaneously, and each node will store and forward the packet from the previous node. After a total of 9 store and forward intervals, each node will receive its intended data packet. This not only occurs without the delay arising from the packet collisions and backoff times, but it also requires only 9 store and forward operations, instead of 10 separate transmit operations as in architectures using CSMA medium access control. In this case realized throughput would be 11 mBit/sec for each node, and the total network capacity would be 110 mBit/sec.

In contrast, in the best case, 10 packets are sent to destination nodes. Each node would be sending its respective data packet at full data capacity and the network would effectively be operating at 1 Gbit/sec. However, this throughput rate is somewhat reduced because a set of message acknowledge packets would be sent to each node's predecessor.

In the case where every node wants to transmit a data packet to a node halfway around the ring, there would be 4 packet (store and forward) delays before the destination node was reached. Ten (10) data packets would reach their destinations after 4 packet intervals, providing a sustained throughput of 25 mBit/sec per node. In this case the total network capacity would be 10 packets passed in 4 intervals, or 250 mBit/sec.

In accordance with the present invention, a ring-based LAN architecture using a twisted-pair transmission medium has been described. The circuitry for the nodes connected in the ring includes a controllable relay for connecting and disconnecting the node from the ring, allowing the node to be by-passed in the event of jabber. The node circuitry also includes a local clock for regeneration of the timing signals used to decode the data packets transmitted along the ring, thereby eliminating the accumulated timing jitter problem otherwise inherent in ring topology networks. A FIFO bypass for reducing the transmission latency of data packets in a bus topology network is used to determine if a received data packet should be sent to the controller connected to a particular node or forwarded to the next node. These features of the present invention combine to produce a hub-less LAN capable of high speed data transmission but which overcomes many of the disadvantages of current bus or ring topology networks.

Furthermore, the node circuitry of the present invention may be used in either a ring or a bus based LAN. This allows the node circuitry to be installed in existing ring or bus based networks, while maintaining the flexibility of being able to be used if the existing LAN is reconfigured to a different architecture at a later time. The current invention allows some of the benefits of a ring based LAN to be incorporated into a bus based LAN (and vice-versa) while reducing some of the disadvantages of each type of LAN.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A network station node structure of a target node in a ring topology local area network (LAN), the LAN including a plurality of station node structures connected by a transmission medium, and wherein the transmission medium connects transmit lines of a node structure to receive lines of a following node structure in the ring topology local area network such that data packets can be circulated through the local area network, and wherein the absence of a GOODLINK/IDLE signal between data packets circulating through the local area network indicated to the target node that the preceding node structure is not properly operating for use in the local area network, the network station node structure comprising:

a data receive node and a data transmit node, the data receive node configured to connect to a data transmit node of a preceding network station in the local area network and the data transmit node configured to connect to a data receive node at a following network station in the local area network;

a relay having an open and a closed state, the closed state connecting the data transmit node of the preceding node structure to the data receive node of the following node structure such that data packets circulating on the local area network bypass the target node;

a transceiver having an input and an output, the open state of the relay causing the transmit node of the preceding network station to be connected to the transceiver input and the receive node of the following network station to be connected to the transceiver output such that data packets circulating on the local area network are provided to the target node; and an idle timer control module connected between the data receive node and the data transmit node of the network station node structure and that responds to an absence of the GOODLINK/IDLE signal between data packets circulating on the LAN by causing the relay to be in the closed state for a predetermined time period.

2. A ring topology local area network (LAN) that includes a plurality of network station node structures connected by a transmission medium, and wherein the transmission medium connects transmit lines of a target network station node structure to receive lines of a following node structure in the ring topology local area network such that data packets can be circulated through the local area network, and wherein the absence of a GOODLINK/IDLE signal between data packets circulating through the local area network indicates to the target node that the preceding node structure is not properly operating for use in the local area network, wherein each network station node structure in the ring topology local area network comprises:

a data receive node and a data transmit node, the data receive node configured to connect to a data transmit node of a preceding network station in the local area network and the data transmit node configured to connect to a data receive node at a following network station in the local area network;

a relay having an open and a closed state, the closed state connecting the data transmit node of the preceding node structure to the data receive node of the following node structure such that data packets circulating on the local area network bypass the target node;

a transceiver having an input and an output, the open state of the relay causing the transmit node of the preceding network station to be connected to the transceiver input and the receive node of the following network station to be connected to the transceiver output such that data packets circulating on the local area network are provided to the target node; and an idle timer control module connected between the data receive node and the data transmit node of the network station node structure and that responds to an absence of the GOODLINK/IDLE signal between data packets circulating on the LAN by causing the relay to be in the closed state for a predetermined time period.

3. A network station node structure as in claim 1, and wherein the transmission medium is twisted-pair cable.

4. A ring topology local area network (LAN) that includes a plurality of network station node structures connected by a transmission medium, and wherein the transmission medium connects transmit lines of a target station node structure to receive lines of a following node structure in the ring topology local area network such that data packets can be circulated through the local area network, and wherein the absence of a GOODLINK/IDLE signal between data packets circulating through the local area network indicates to the target node that the preceding node structure is not properly operating for use in the local area network, wherein each network station node structure in the ring topology locak area network comprises:

a data receive node and a data transmit node, the data receive node configured to connect to a data transmit node of a preceding network station in the local area network and tha data transmit node configured to connect to a data receive node at a following network station in the local area network;

a relay having an open and a closed state, the closed state connecting the data receive node of the preceding node structure to the data receive node of the following node strucuture such that data packets circulating on the local area network bypass the target node;

a transceiver having an input and an output, the open state of the relay causing the transmit node of the preceding network station to be connected to the tranceiver input and the receive node of the following network station to be connected to the transceiver output such that data packets circulating on the local area network are provided to the target node; and an idle timer control module connected between the data receive node and the data transmit node of the network station node structure and that responds to an absence of the GOODLINK/IDLE signal between data packets circulating on the LAN by causing the relay to be in the closed state for a predetermined time period.

5. A ring topology local area network (LAN) as in claim 4, and wherein the relay of each network station node structure in the ring topology local area network includes restore circuitry that, following the predetermined time period, responds to restoration of the GOODLINK/IDLE signal by the preceding network station by causing the relay to enter the open state.

6. A ring topology local area network (LAN) as in claim 4, and wherein the tranmission medium is twisted-pair cable.

7. A method of bypassing a network node structure of a target node in a ring topology local area network (LAN), wherein the LAN includes a plurality of station node structures connected by a transmission medium, and wherein the transmission medium connects transmit lines of a node structure to receive lines of a following node structure in the LAN such that data packets can be circulated through the LAN, and wherein the absence of a GOODLINK/IDLE signal between data packets circulating through the LAN indicates to the target node structure that a preceding node structure is not properly operating for use in the LAN, the method comprising:

connecting a data receive node of the network node structure to a data transmit node of a preceding network station in the LAN;

connecting a data transmit node of the network node structure to a data receive node of a following network station in the LAN;

causing a relay located in the network node structure to close for a predetermined time period in response to an absence of the GOODLINK/IDLE signal between data packets received by the network node station, thereby connecting the data receive node of said station structure to the data transmit node of said station structure such that data packets circulating on the LAN bypass the target node.

8. A method as in claim 7, and further comprising:

following the predetermined time peroid, causing the relay to respond to restoration of the GOODLINK/IDLE signal by the preceding network station by entering an open state such that data packets circulating on the LAN are provided to the target node.

9. A method as in claim 7, and wherein the transmission medium is twisted-pair cable.

* * * * *

UNITED STATES PATENT AND TRADEMARK OFFICE
CERTIFICATE OF CORRECTION

PATENT NO.: 6,028,837
DATED: February 22, 2000
INVENTOR(S): David J. Miller

It is certified that an error appears in the above-identified patent and that said Letters Patent is hereby corrected as shown below:

In Col. 12, at line 20 insert:

--10. A network station node structure as in claim 1, and wherein the relay includes restore circuitry that, following the predetermined time period, responds to restoration of the GOODLINK/IDLE signal by the preceding network station by causing the relay to enter the open state.--

Signed and Sealed this

Thirteenth Day of March, 2001

Attest:

NICHOLAS P. GODICI

Attesting Officer

Acting Director of the United States Patent and Trademark Office